Nov. 25, 1969   A. J. ANTHONY   3,480,510
NUCLEAR REACTOR AND CONTROL ROD THEREFOR
Filed Aug. 4, 1966   3 Sheets-Sheet 1
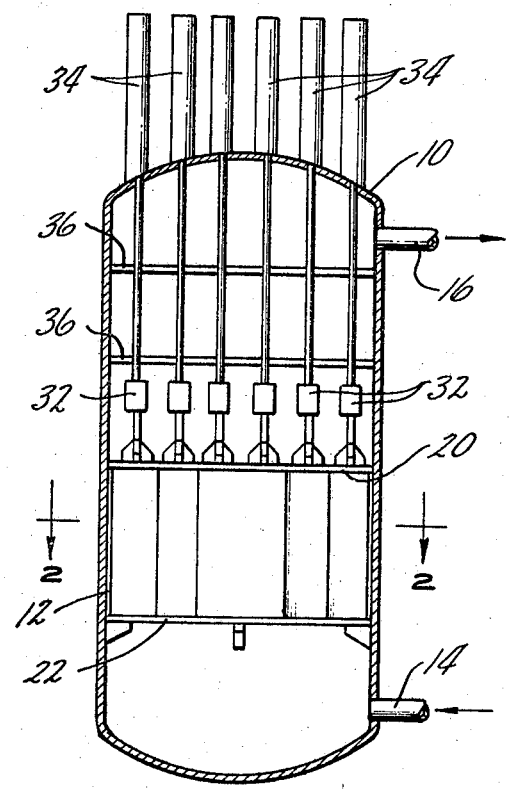
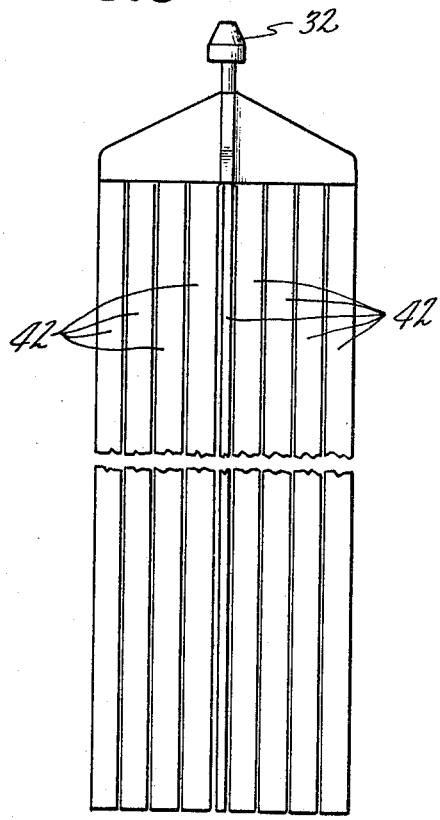
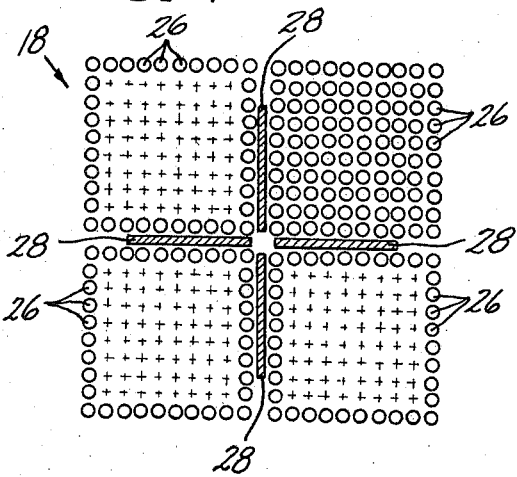
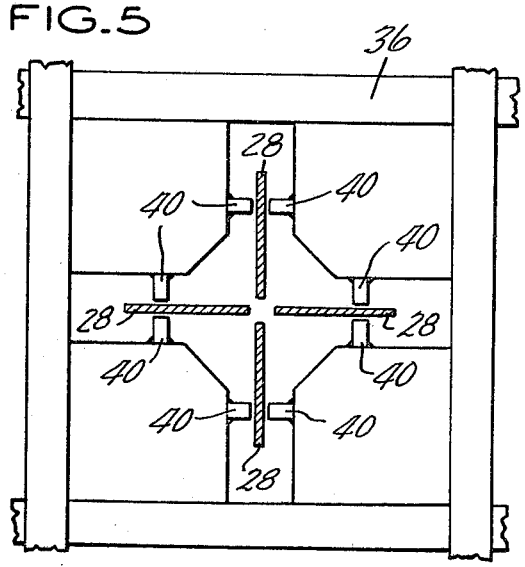
INVENTOR
ANDREW J. ANTHONY
BY E. L. Kochey
AGENT Nov. 25, 1969  A. J. ANTHONY  3,480,510
NUCLEAR REACTOR AND CONTROL ROD THEREFOR
Filed Aug. 4, 1966
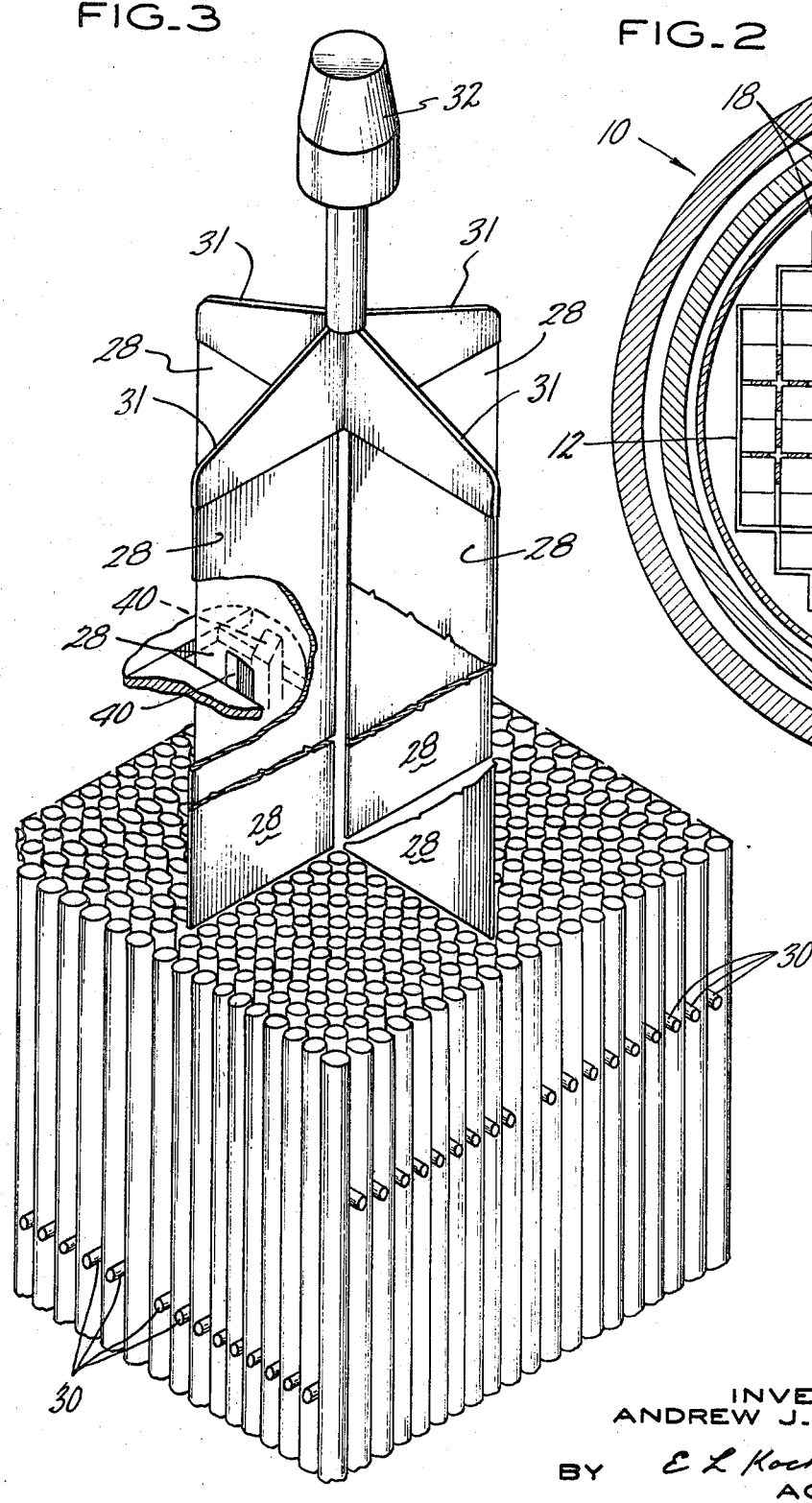
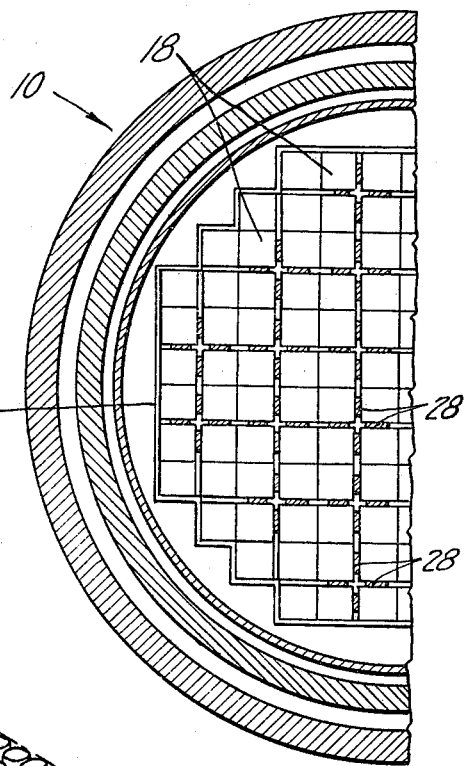
INVENTOR
ANDREW J. ANTHONY
BY
AGENT Nov. 25, 1969        A. J. ANTHONY        3,480,510

NUCLEAR REACTOR AND CONTROL ROD THEREFOR

Filed Aug. 4, 1966        3 Sheets-Sheet 3

INVENTOR
ANDREW J. ANTHONY

BY E. L. Kochey

AGENT

United States Patent Office 3,480,510
Patented Nov. 25, 1969

3,480,510
NUCLEAR REACTOR AND CONTROL ROD THEREFOR
Andrew J. Anthony, Tariffville, Conn., assignor to Combustion Engineering, Inc., Windsor, Conn., a corporation of Delaware
Continuation-in-part of application Ser. No. 422,290, Dec. 30, 1964. This application Aug. 4, 1966, Ser. No. 573,755
Int. Cl. G21c 7/00
U.S. Cl. 176—35         11 Claims

ABSTRACT OF THE DISCLOSURE

A nuclear reactor and a flexible control rod therefor wherein less tolerance is required for the control rod opening between adjacent fuel assemblies. The control rod comprises a plurality of independent rectangular blades located in different planes and rigidly connected at the driven end. Each blade is in spaced relation with the other blades of the control rod throughout substantially its entire remaining length, providing flexibility of each blade in one plane.

---

This application is a continuation-in-part of application Ser. No. 422,290, now abandoned, filed Dec. 30, 1964.

This invention relates generally to nuclear reactors and in particular to heterogeneous reactors with the invention being directed to design of control rods therefor.

In the type of reactor to which the invention pertains at least a portion of the reactiviy or power ouput of the reactor is controlled by the adjustment of control rods with relation to the reactor core. The reactivity is decreased as the control rods are inserted further into the core. The core of large reactors is constructed of a relatively large number of separate fuel assemblies. Each of these assemblies is comprised of a number of fuel elements which may be tubes filled with a fuel material, with the elements in each assembly being in fixed spaced relation so that the coolant can pass over the elements of the assembly. Each of these assemblies is generally separately removable from the reactor core and interchangeable.

The fuel assemblies are generally formed in the shape of squares or hexagons with the flat sides of adjacent assemblies being parallel. The control rods are made in the shape of a cruciform, H, or Y, so that the flat portions of the rods pass intermediate the fuel assemblies. Rods of these forms are quite stiff.

Since the liquid flowing through the reactor core is the moderator in this type of a reactor, the power generated locally is a function of the local moderator quantity. When the spacing between adjacent assemblies becomes excessive, the heavy concentration of moderator in this area when the control rods are withdrawn causes the outer fuel elements of the assemblies to burn up at a higher rate. In order to avoid this, the ideal condition would be one in which the spacing between the outer fuel elements of adjacent assemblies is equal to the spacing bewteen the fuel elements within the assembly. Since in power reactors it is of significant advantage to have the core as small as possible, it is not practical to increase the spacing within the fuel assemblies to compensate for a wide water gap between fuel assemblies.

One method employed to avoid the water gap problem is to use the full length control rod followers which serve to displace the moderator-coolant when the control rod is withdrawn. With full length followers a longer pressure vessel is required in order to accommodate the followers within the vessel when the control rods are in their fully inserted position.

It is accordingly of significant importance to reduce the spacing between fuel assemblies to a minimum value. The thickness of a control blade of the cruciform type and formed of hafnium is generally in the order of 0.2 inch. In the manufacture of such a blade in addition to the tolerance of the blade thickness, there are several additional tolerances to be considered. These control rods which are in the order of 11 feet long cannot be fabricated so as to be absolutely straight so that some tolerance must be allowed for the bowing of the stiff control rod. Also the angularity of the various blades with respect to one another cannot be precisely maintained and additional tolerances must be allowed for this. Accordingly even though the blade is only .2 inch thick, a minimum free water gap of .425 inch must be maintained between the adjacent fuel assemblies at all times. This increase in the water gap increases the problem of hot spots within the reactor. In my invention a control rod passing intermediate the fuel assemblies is of a generally simple rectangular shape so that there is little resistance to bending in a direction perpendicular to the flat sides of the adjacent assemblies, but considerable resistance to bending in a direction parallel to the flat sides of the adjacent assemblies. Also there is only slight resistance to torsion. Since the control rods are flexible, distortion of the control rod throughout its length during fabrication is not a restriction in determining the spacing between adjacent fuel assemblies. The control rod may pass between assemblies even though the control rod is formed or the space through which it is passed is warped or slightly sinuous. Accordingly no tolerance need be allowed for the distortion of the control rod throughout its length nor for the angular distortion of the control rod, and the water gap may be accordingly reduced.

It is an object of this invention to provide an improved nuclear reactor organization wherein an improved control rod design is utilized.

It is a further object of this invention to provide control rods which are flexible so that the water gap between adjacent fuel assemblies may be reduced.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein:

FIGURE 1 is a diagrammatic representation of a nuclear reactor employing the present invention;

FIGURE 2 is a fragmentary sectional plan view through the reactor core;

FIGURE 3 is a perspective view showing the control rod assembly associated with the fuel assembly and the blade guides;

FIGURE 4 is a detailed sectional plan view through several fuel assemblies showing the location of the control blades;

FIGURE 5 is a detailed plan view showing a detail of the control rod guides;

FIGURE 6 is an elevational view of a control blade assembly having each blade subdivided.

Figure 7:
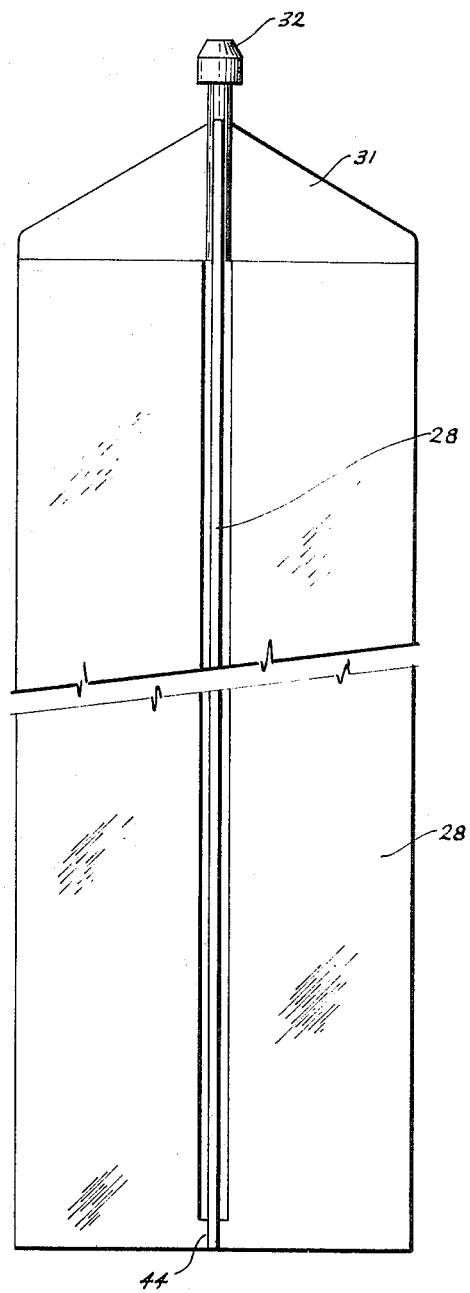
FIGURE 7 is an elevational view of a control blade assembly having the blades joined at the lower end.

Referring now to the drawings wherein like reference characters are used throughout to designate like elements, there is diagrammatically depicted in FIGURE 1 a pressurized water nuclear reactor which includes a pressure vessel 10 in which is mounted a core 12. Water enters the vessel 10 through the inlet 14 and passes up through the core where the water is heated by contacting the outer surface of the fuel elements, with this heated water passing from the vessel 10 through the outlet 16. The reactor core 12 is comprised of a relatively large number of separate and independent fuel assemblies 18 which are maintained in fixed spaced relation with each other in the reactor core by means of the upper and lower plates or grids 20 and 22 and which are independently removable from the core.

Each fuel assembly includes a plurality of rod type fuel elements 26 which may be stainless steel tubes within which is contained compacted $UO_2$ powder with the tubes being sealed and capped at both ends. The fuel rods 26 of the assembly 18 are all in parallel, uniformly spaced relation and are maintained in such fixed relation by any suitable means such as providing spacer bars 30 between the various rows of tubes with the tubes being welded to the spacer bars. A number of such spacer bars will, of course, be provided throughout the length of the assembly 18.

Control blade assemblies are supported so that four rectangular control blades 28 pass intermediate adjacent fuel assemblies 18, with the blades being parallel to the flat adjacent sides of the fuel assemblies. The four independent control blades are joined in a cruciform 31 at the upper or driven end of the control blades and joined to connector 32 through which they are driven by control rod drives 34. Each of these blades being in the form of a flat rectangular plate instead of the cruciform or H shape of previous control rods is flexible in the direction transverse to the flat sides of the adjacent fuel assemblies.

FIGURE 2 is a sectional plan view taken through the reactor core. It can be seen from this view that the portion of the control rod assembly which is within the reactor core consists of a group of four independent control blades. Each of these blades is spaced from the others and is rectangular with substantial flexibility in a direction transverse to the flat sides of the adjacent fuel assemblies 18 while being relatively stiff in the direction parallel to the flat sides of the fuel assemblies. The rigid connection at the cruciform shaped driven end together with the stiffness of the blades parallel to the assembly walls permits accurate maintenance of the blade locations in the intermediate spaces. A rigid connection is maintained by having the blades in intersecting planes. The spaced relation throughout the remainder of the length of the blades is essential to the desired flexibility.

A plurality of lattice frameworks 36 are mounted in the vessel 10 and carry thereon guide spacers 40. The spacing between opposing guide spacers is only slightly greater than the thickness of the control blade and act to prevent buckling of the control blade when the control blade assembly is driven down by the control rod drives 34. While the blades are free from buckling where they are laterally supported by the fuel assemblies, they are susceptible to buckling of the withdrawn portion. These guides should have a tapered entrance at both the top and the bottom, the entrance at the bottom insuring that the control blades will not hang up on the guides when withdrawn. The tapered entrance at the top facilitates the insertion of the control rods when the control elements are being inserted into the reactor vessel.

FIGURE 4 is a detailed plan view through a portion of the reactor core illustrating the relationship between the control blades 28 and the fuel assembly 18. FIGURE 3 illustrates the construction showing the fuel elements 26 and the spacer bars 30. The control blades are 11 feet long, are 5¼ inches in width and .2 or less inch in thickness. Thinner blades could, of course, be used, increasing the advantages of my invention. The spacing between the fuel elements within the fuel assembly is .150 inch as measured between the outer surfaces of the adjacent fuel elements. The spacing between the outer fuel elements of adjacent assemblies is .0325 inch as measured from the outer surfaces of these adjacent elements. This includes 0.2 inch for the control blade thickness and 0.025 inch clarance. The excess clearance of 0.10 inch is that due to fabrication and erection tolerances on the fuel assemblies since according to my invention a clearance of not more than .025 inch is required on the control blade to permit free movement. If this control rod had been of the rigid cruciform type, the water gap would be .425 inch rather than the instant .325 inch. This improves the reactor performance by decreasing the over-all peak 10 to 15 percent. Therefore 15 percent more power may be obtained from the same core size.

FIGURE 5 is a detailed view showing the relationship between the lattice frame work 36 and the control blades 28. This illustrates the method by which the guide spacers 40 are mounted on the frame work. A clearance between the control blades and guide spacer of .125 inch is recommended. The guides may alternately be of the continuous shroud type, or any other type sufficient to restrain buckling of the control blades.

The flexibility of the control blades may be further increased by dividing each blade longitudinally into several sections as illustrated in FIGURE 6. In this illustration each blade is divided into four control blade segments 42. Each of these segments is 1 5/16 inches in width and .2 inch in thickness. Accordingly, each of these segments still maintains the characteristic that it is relatively flexible in the direction transverse to the adjacent fuel assemblies while it is relatively rigid in the direction parallel to these flat sides. The moment of inertia is 0.0035 $inch^4$ in one direction and 0.151 $inch^4$ in the other. The ratio of the moments of inertia in the two directions is just over 40, which is the recommended minimum for a proper balance of flexibility perpendicular to the adjacent fuel assembly surface and stiffness parallel to the surface. Where binding tends to ocurr due to the blade and water gap space being slightly askew, only one edge of the blade will bind and the particular segment of the blade which is binding will bend more readily than an undivided blade.

These blades may, in addition to being joined at the top, be also joined at the bottom, as illustrated in FIGURE 7. The blades are laterally extended so that projections 44 abut one another. The blades are joined here in the same manner that conventional blades are joined througout their length, without increasing the blade thickness. They are welded or brazed, depending on the particular blade thickness.

Retention of the simple rectangular shape of each blade throughout the length retains a considerable amount of the flexibility although the structure is slightly more rigid than the preferred embodiment where the bottoms of the blades are free. If insufficient guides 40 are placed to avoid buckling of a blade, it may tend to bind and by joining this particular blade which is binding with three other blades which are functioning properly, a tensile force is put on this blade from the bottom tending to straighten and free it.

Although the description of the specific embodiment herein illustrated is specific to the cruciform type construction, it may be equally employed on a Y or H construction. While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A nuclear reactor comprising a plurality of spaced elongated parallel fuel assemblies, having straight sides; the fuel assemblies being located so that adjacent straight sides are parallel; fluid moderator intermediate the fuel assemblies; control blades positioned intermediate the fuel assemblies and longitudinally adjustable; a plurality of control blade assemblies; means for driving the control blade assemblies from one end; each blade assembly comprising: a plurality of rectangular blades in intersecting planes; and said blades each being permanently and rigidly joined to the other blades of the assembly at the driven end to form a rigid structure at the junction, with said blades being in spaced relation throughout substantially the entire remainder of their length to provide flexibility in the individual blades, thereby forming said control blade assembly.

2. An apparatus as in claim 1 wherein each of said rectangular blades has a moment of inertia around the axis perpendicular to the side of the adjacent fuel assembly at least 40 times the moment of inertia around the axis parallel to the side of the adjacent fuel assembly.

3. An apparatus as in claim 1 wherein said blades of the control blade assembly are also rigidly joined to the other blades of the assembly at the end of the blades opposite the driven end, said blades being in spaced relation with one another only intermediate the extreme ends.

4. An apparatus as in claim 2 wherein said blades of the control blade assembly are also rigidly joined to the other blades of the assembly at the end of the blades opposite the driven end, said blades being in spaced relation with one another only intermediate the extreme ends.

5. An apparatus as in claim 1 wherein said blades of the control assembly are in two intersecting planes whereby a cruciform shape is formed at the driven end.

6. An apparatus as in claim 1 wherein said blades are joined only at the driven end, and are in spaced relation throughout the entire remainder of their length.

7. A control rod for a nuclear reactor comprising a plurality of rectangular blades in intersecting planes; said blades each being permanently and rigidly joined to the others at one end of said blades to form a rigid structure at the junction, with said blades being in spaced relation throughout substantially the entire remainder of their length to provide flexibility in the individual blades.

8. An apparatus as in claim 7 wherein each of said rectangular blades has a moment of inertia around the axis perpendicular to the side of the adjacent fuel assembly at least 40 times the moment of inertia around the axis parallel to the side of the adjacent fuel assembly.

9. An apparatus as in claim 7 wherein said blades are also rigidly joined to the other blades of the control rod at the other end of said blades, said blades being in spaced relation with one another only intermediate the extreme ends.

10. An apparatus as in claim 8 wherein said blades are also rigidly joined to the other blades of the control rod at the other end of said blades, said blades being in spaced relation with one another only intermediate the extreme ends.

11. An apparatus as in claim 7 wherein said blades are joined only at the driven end, and are in spaced relation throughout the entire remainder of their length.

References Cited

UNITED STATES PATENTS

| 2,982,713 | 5/1961 | Sankovich et al. | 176—61 |
| 2,983,659 | 5/1961 | Treshow | 176—86 |
| 3,089,836 | 5/1963 | Wootton | 176—86 |
| 3,150,051 | 9/1964 | Ammon | 176—61 |
| 3,158,545 | 11/1964 | Jones | 176—86 |

OTHER REFERENCES

AEC Document, ACNP-6106, 1961, pp. 1, 5, 6, and 10–14.

CARL D. QUARFORTH, Primary Examiner

HARVEY E. BEHREND, Assistant Examiner

U.S. Cl. X.R.

176—86